United States Patent
Shibao et al.

(10) Patent No.: US 10,732,915 B2
(45) Date of Patent: Aug. 4, 2020

(54) MANUFACTURING ASSISTANCE APPARATUS

(71) Applicant: SUBARU CORPORATION, Tokyo (JP)

(72) Inventors: Yasunori Shibao, Tokyo (JP); Yuichi Nagai, Tokyo (JP); Iwao Murata, Tokyo (JP); Marosuke Kikuchi, Tokyo (JP); Kei Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/174,562

(22) Filed: Oct. 30, 2018

(65) Prior Publication Data

US 2019/0163428 A1 May 30, 2019

(30) Foreign Application Priority Data

Nov. 30, 2017 (JP) ................. 2017-229970

(51) Int. Cl.
*G06F 3/14* (2006.01)
*G06T 7/00* (2017.01)
(Continued)

(52) U.S. Cl.
CPC ............. *G06F 3/14* (2013.01); *G05B 19/048* (2013.01); *G05B 19/41805* (2013.01);
(Continued)

(58) Field of Classification Search
CPC ......... G06F 3/14; H04N 7/183; G06T 7/0004; G06T 2207/30164; G05B 19/41805;
(Continued)

(56) References Cited

U.S. PATENT DOCUMENTS 6,822,734 B1 * 11/2004 Eidelman ........... G01N 21/8806
356/237.2
2012/0029678 A1 * 2/2012 McGreevy ............. G06Q 10/06
700/108
(Continued)

FOREIGN PATENT DOCUMENTS

| JP | 2013-257861 A | 12/2013 |
|----|----|----|
| JP | 5931458 B | 6/2016 |
| WO | 2016/132731 A1 | 8/2016 |

OTHER PUBLICATIONS

Extended European Search Report issued in corresponding European Patent Application No. 18 204 238.2 dated Apr. 23, 2019.
(Continued)

*Primary Examiner* — Marnie A Matt
(74) *Attorney, Agent, or Firm* — Troutman Sanders LLP

(57) ABSTRACT

A manufacturing assistance apparatus includes a display, an imaging device, a completion determining unit, and a display controller. The display is configured to display operation information that is related to any of operation processes of a workpiece. The imaging device is configured to perform imaging of the workpiece, and output image data obtained by the imaging. The completion determining unit is configured to determine whether current one of the operation processes is completed, on a basis of the image data outputted from the imaging device. The display controller is configured to cause, when the current one of the operation processes is determined by the completion determining unit as being completed, the display to display the operation information that is related to subsequent one of the operation processes.

17 Claims, 7 Drawing Sheets

(51) Int. Cl.
  *H04N 7/18*    (2006.01)
  *G05B 19/048*  (2006.01)
  *G05B 19/418*  (2006.01)

(52) U.S. Cl.
  CPC ........... *G06T 7/0004* (2013.01); *H04N 7/183* (2013.01); *G05B 2219/31027* (2013.01); *G05B 2219/31048* (2013.01); *G06T 2207/30164* (2013.01)

(58) Field of Classification Search
  CPC ........ G05B 19/048; G05B 2219/31048; G05B 2219/31027
  USPC .......................................................... 348/92
  See application file for complete search history.

(56) References Cited

U.S. PATENT DOCUMENTS

| | | | |
|---|---|---|---|
| 2013/0186552 A1* | 7/2013 | Asahara | ................ F16B 39/225 156/92 |
| 2013/0307773 A1 | 11/2013 | Yagishita | |
| 2013/0325155 A1 | 12/2013 | Ryznar et al. | |
| 2016/0343125 A1* | 11/2016 | Keitler | ............... G01B 11/2513 |
| 2018/0027218 A1 | 1/2018 | Kiso et al. | |
| 2018/0184668 A1* | 7/2018 | Stork genannt Wersborg ............. F24C 7/087 |

OTHER PUBLICATIONS

Notice of Reasons for Refusal issued in corresponding Japanese Patent Application No. 2017-229970 dated Oct. 29, 2019, with English machine translation.

* cited by examiner

MANUFACTURING ASSISTANCE APPARATUS

CROSS-REFERENCE TO RELATED APPLICATIONS

The present application claims priority from Japanese Patent Application No. 2017-229970 filed on Nov. 30, 2017, the entire contents of which are hereby incorporated by reference.

BACKGROUND

The technology relates to a manufacturing assistance apparatus that assists operations of a product manufacturing.

Manufacturing, without limitation, an aircraft involves operations including fastening a first member and a second member. In such operations, through holes are formed on the first member and the second member, following which a fastener is inserted through the first member and the second member. For example, reference is made to Japanese Patent No. 5931458.

SUMMARY

An aspect of the technology provides a manufacturing assistance apparatus that includes: a display configured to display operation information that is related to any of operation processes of a workpiece; an imaging device configured to perform imaging of the workpiece, and output image data obtained by the imaging; a completion determining unit configured to determine whether current one of the operation processes is completed, on a basis of the image data outputted from the imaging device; and a display controller configured to cause, when the current one of the operation processes is determined by the completion determining unit as being completed, the display to display the operation information that is related to subsequent one of the operation processes.

An aspect of the technology provides a manufacturing assistance apparatus that includes: a display configured to display operation information that is related to any of operation processes of a workpiece; an imaging device configured to perform imaging of the workpiece, and output image data obtained by the imaging; and circuitry configured to determine whether current one of the operation processes is completed, on a basis of the image data outputted from the imaging device, and cause, when the current one of the operation processes is determined as being completed, the display to display the operation information that is related to subsequent one of the operation processes.

DETAILED DESCRIPTION

Figure 1:
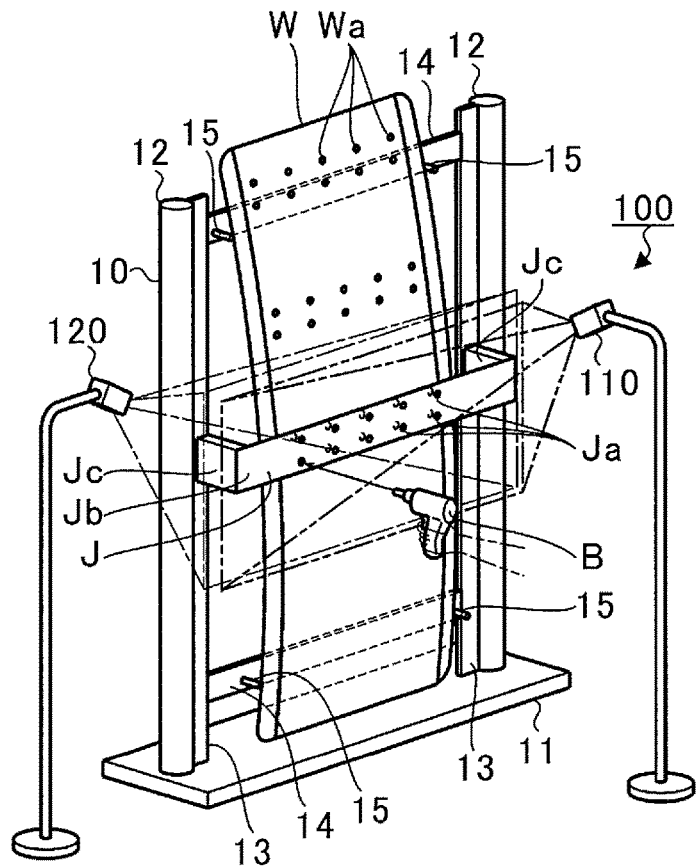
FIG. 1 is a diagram illustrating an overview of an operation process performed on a workpiece.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Upon manufacturing any product including an aircraft, operations are carried out in a stepwise fashion, such as beginning a subsequent operation process after completing any of the operation processes. During such stepwise operations, an efficiency of operation improves if information on any of the operation processes is displayed on a display. The operation efficiency, however, decreases if a worker is forced to switch contents displayed on the display upon beginning the subsequent operation process after completing any of the operation processes.

It is desirable to provide a manufacturing assistance apparatus that improves an operation efficiency.

Figure 2:
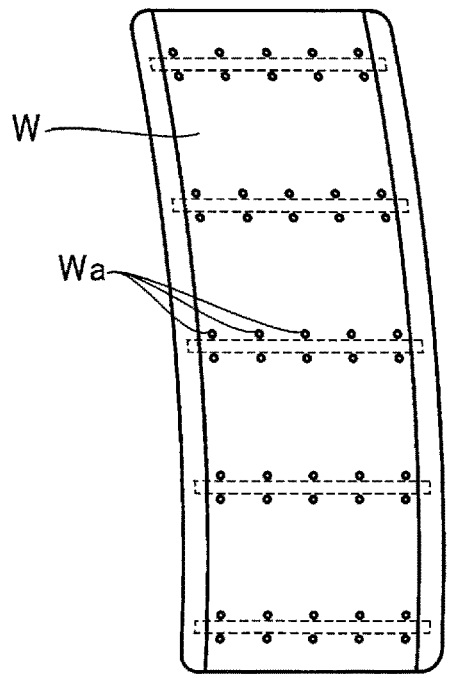
FIG. 2 is a diagram illustrating an example of the workpiece.

FIG. 1 is a diagram illustrating an overview of an operation process performed on a workpiece W. FIG. 2 is a diagram illustrating an example of the workpiece W. Note that FIG. 2 illustrates a non-limiting example in which the workpiece W as a work object is a wing component, although the workpiece W can be any component other than a component of a wing. A brief description is given first on an example of an operation process performed on the workpiece W.

Referring to FIG. 1, the workpiece W may be attached to a support 10. For example, the support 10 may include a base 11 and two pillars 12 that stand on the base 11. The support 10 may also include two vertical frames 13 each provided on an inner side of corresponding one of the two pillars 12, and horizontal frames 14 so provided on respective upper end side and lower end side of the two vertical frames 13 as to bridge those vertical frames 13. The two horizontal frames 14 may support the workpiece W, and may include locating pins 15 that allow for positioning of the workpiece W.

The vertical frames 13 may be attached with a jig J. The jig J may be a perforated plate, and may have a body Jb and legs Jc. The body Jb may have a plate-like shape, and may have a plurality of through holes Ja. The legs Jc may extend toward the respective vertical frames 13 from both ends of the body Jb, and may be held by unillustrated retainers formed on the respective vertical frames 13.

Note that FIG. 1 illustrates a non-limiting example in which one jig J is provided; however, two or more jigs J may be used. For example, the jigs J may be provided separately for formation of respective five sets of through holes Wa that are to be formed on the workpiece W as illustrated in FIG. 2. Each set may include two lines of through holes Wa. For example, the two lines of through holes Wa may be adapted to fasten together the workpiece W and a beam member that is eventually provided between the two lines of through holes Wa. The retainers each may be provided on the vertical frames 13 at positions corresponding to relevant one of the sets of through holes Wa of the workpiece W. A worker may replace one jig J with another for each set of through holes Wa upon an operation process of perforating the through holes Wa. The through holes Wa of the workpiece W may be formed through inserting a tool of a perforating device B into any of the through holes Ja of the jig J to thereby form the through holes Wa of the workpiece W at their respective designed positions.

In the following, a description is given of a manufacturing assistance apparatus 100 according to an example implementation which assists operations to be performed on the workpiece W, such as that described above. Note that the operation process described above with reference to FIGS. 1 and 2 is illustrative and non-limiting. The manufacturing assistance apparatus 100 according to any implementation of the technology is applicable to various operation processes besides the operation process described above.

Figure 3:
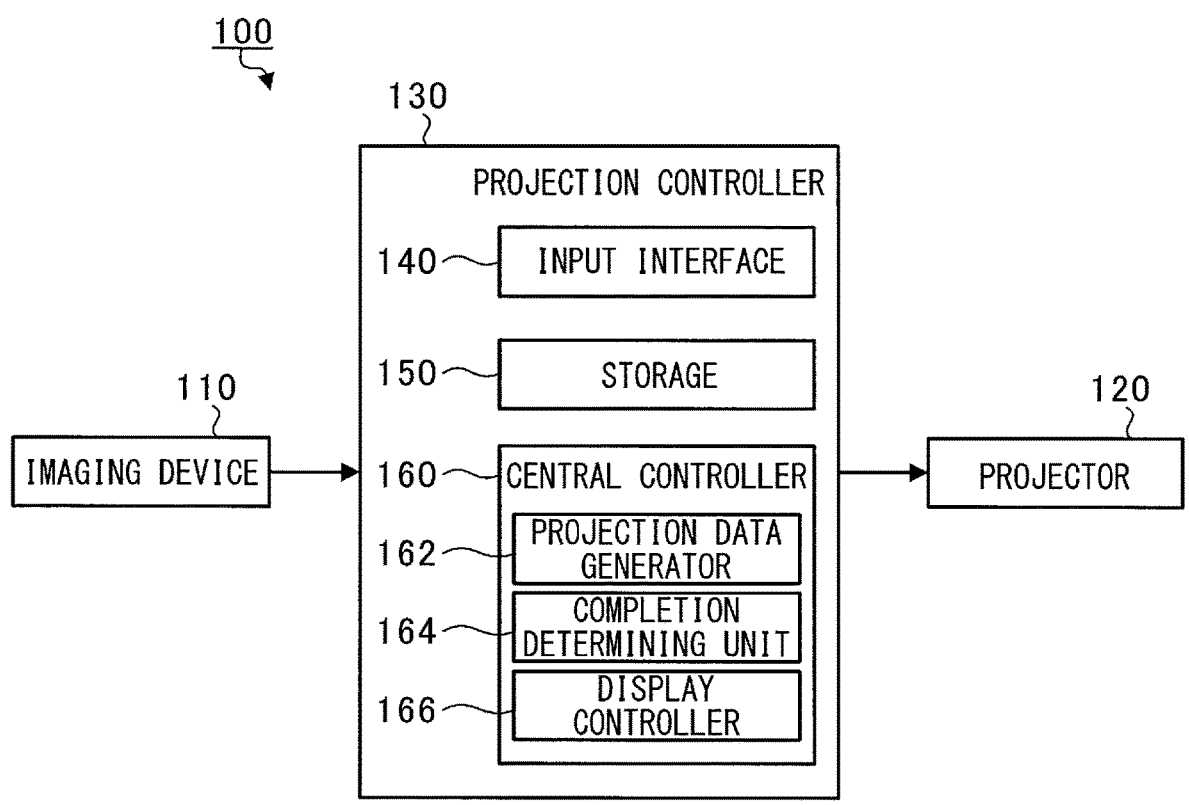
FIG. 3 is a block diagram illustrating an example of a configuration of a manufacturing assistance apparatus according to one implementation of the technology.

FIG. 3 is a block diagram illustrating an example of a configuration of the manufacturing assistance apparatus 100 according to an example implementation of the technology, in which a solid arrow denotes a flow of data. The manufacturing assistance apparatus 100 may include an imaging device 110, a projector 120, and a projection controller 130. In one implementation, the projector 120 may serve as a "display". In an example implementation, the manufacturing assistance apparatus 100 may use a projection mapping technique that projects an image on a surface of a three-dimensional object having a flat surface, a non-flat surface, or both.

The imaging device 110 performs imaging of the workpiece W and thereby generates captured image data. The imaging device 110 may be able to communicate with the projection controller 130 by wire or wirelessly, and may transmit the thus-generated captured image data to the projection controller 130. FIG. 1 illustrates a non-limiting example in which a region of the imaging performed by the imaging device 110 covers a part of the workpiece W; however, the imaging region of the imaging device 110 may cover the workpiece W as a whole. Further, the manufacturing assistance apparatus 100 may further include an adjusting mechanism that so automatically adjusts an orientation of the imaging device 110 as to allow at least a region of operation, in the workpiece W, performed by the worker to be included in the imaging region of the imaging device 110.

The projector 120 may be, for example, a digital light processing (DLP) projector, a liquid crystal projector, or any other device that projects an image. The projector 120 may project an image onto the workpiece W, on the basis of a control performed by the projection controller 130. FIG. 1 illustrates a non-limiting example in which one projector 120 is provided; however, the manufacturing assistance apparatus 100 may include a plurality of projectors 120. Further, although a region of the projection performed by the projector 120 covers a part of the workpiece W as with a case of the imaging device 110 in the non-limiting example illustrated in FIG. 1, the projection region of the projector 120 may cover the workpiece W as a whole. Further, the manufacturing assistance apparatus 100 may further include an adjusting mechanism that so automatically adjusts an orientation of the projector 120 as to allow at least the operation region in the workpiece W to be included in the projection region of the projector 120.

The projection controller 130 may be a personal computer, for example. The projection controller 130 may cause the projector 120 to project an image. The projection controller 130 may include an input interface 140, a storage 150, and a central controller 160. Note that the projection controller 130 is not limited to the personal computer. For example, the projection controller 130 may be a dedicated device or any computable device in an alternative example implementation. In a yet alternative example implementation, the projection controller 130 may be provided in the projector 120, or may be built in a portable device such as, but not limited to, a tablet computer.

The input interface 140 may be one or more of devices including a mouse, a keyboard, and a touch sensor, for example. The input interface 140 may accept an input operation performed by a user, and transmit, to the central controller 160, input information that represents a result of the input operation performed by the user.

The storage 150 may be any storage including a hard disk drive (HDD), for example. The storage 150 may contain image data on which an image to be projected by the projector 120, i.e., a projection image, is based.

The central controller 160 may be a microcomputer, and may control, in an overall fashion, the projection controller 130 as a whole. The microcomputer may have devices including a central processing unit (CPU), a read-only memory (ROM) in which pieces of information including a program are stored, and a random-access memory (RAM) that serves as a work area.

The central controller 160 may execute the program to serve as a projection data generator 162, a completion determining unit 164, and a display controller 166. In one implementation, the central controller 160 may serve as one or more of a "projection data generator", a "completion determining unit", and a "display controller". The projection data generator 162 may generate projection data on the basis of the image data stored in the storage 150. The projection data may represent the projection image to be projected onto the workpiece W. The projection data generated by the projection data generator 162 may be transmitted to the projector 120.

The workpiece W onto which the projection image is to be projected may possibly have a curved surface, and the projection image may possibly be projected onto the curved surface in some cases. To address this, the manufacturing assistance apparatus 100 may calibrate the projection image, in order to prevent an image projected onto the workpiece W from being seen in a distorted fashion when the worker sees the image from a predetermined fixed point. For example, the worker sees an image projected onto the workpiece Was an image of an ellipse if an image of an exact circle is projected as it is onto the curved workpiece W. In such an example case, the projection data generator 162 may process image data that is before the calibration (i.e., image data on the image of the exact circle) into image data on the image of the ellipse on the basis of shape data of a projection surface (i.e., a surface of the workpiece W) and a position of the projector 120, and may transmit the thus-processed image data to the projector 120. Note that the ellipse obtained from the image data following the calibration has an orientation in which the long side and the short side are reversed with respect to those of an orientation of the ellipse obtained from the image data that is before the calibration, thus allowing the worker to see the image of the exact circle accordingly. In an alternative example implementation, the manufacturing assistance apparatus 100 may calibrate the projection image through: projecting the projection image in a divided fashion, e.g., in a grid-like pattern; and so adjusting the generation of the projection data that a shape of the grid-like pattern is seen undistorted or less distorted in an image actually displayed on a curved surface of a target object.

Figure 4A:
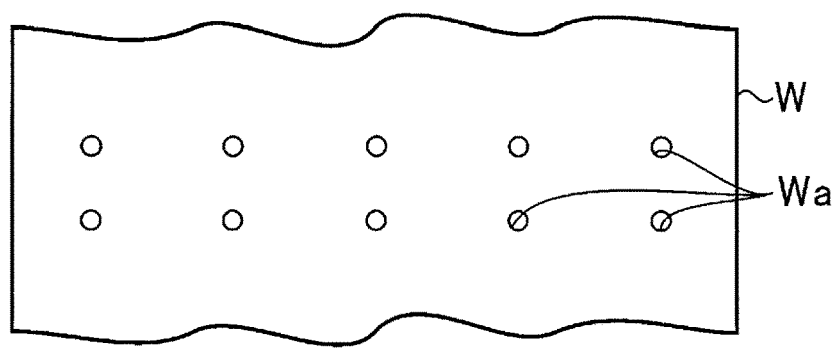
FIG. 4A to FIG. 4D are diagrams each illustrating an example of a projection process performed by a projection controller illustrated in FIG. 3.
Figure 4B:
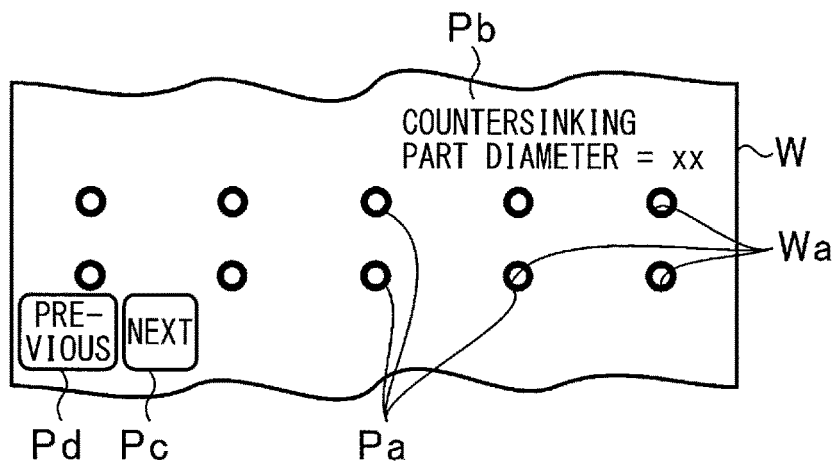

FIG. 4A to FIG. 4D are diagrams each illustrating an example of a projection process performed by the projection controller 130. FIG. 4A illustrates an example in which the through holes Wa have been formed with use of the perforating device B and the jig J. An operation process subsequent to the operation process illustrated in FIG. 4A is to chamfer an edge of each through hole Wa circularly to thereby form a countersinking part. Referring to FIG. 4B, the projection data generator 162 may generate, as operation information, the projection image related to the workpiece W that is at the time of completion of the operation process of FIG. 4B.

For example, the storage 150 may contain, for each operation process of the workpiece W, projection information representing the projection image to be projected and a position in the workpiece W at which such a projection image is to be projected. The projection information may contain data on an inner diameter and an outer diameter of a later-described ring shape, for example. The projection information may be set in advance by the worker by means of the input interface 140 or any other method that sets the projection information.

The projection data generator 162 may read the projection information from the storage 150, and specify a factor of the projection image that corresponds to the current operation process. Non-limiting examples of the factor may include a shape and a position of the projection image. The projection data generator 162 may thereafter generate image data of a projection image Pa having the ring shape on the basis of the specified factor, such as the shape, of the projection image. The projection image Pa may have an inner diameter that corresponds to an inner diameter of the through hole Wa that is before the chamfering. The projection image Pa may have an outer diameter that corresponds to an outer diameter of the through hole Wa that is after the chamfering.

The projection data generator 162 may also generate, on the basis of the projection information, image data representing a projection image Pb, image data representing a projection image Pc, and image data representing a projection image Pd. The projection image Pb may represent a diameter of the countersinking part in characters. The projection image Pc may represent a subsequent-process switching button that switches a content displayed or projected on the workpiece W to a content belonging to the operation information that is related to the subsequent operation process. The projection image Pd may represent a previous-process switching button that switches a content displayed or projected on the workpiece W to a content belonging to the operation information that is related to the previous operation process.

The display controller 166 may so control the projector 120 as to display or project the pieces of image data generated by the projection data generator 162 on the workpiece W. In other words, the display controller 166 may cause the projector 120 to display or project, on the workpiece W, the operation information related to the relevant operation process of the workpiece W.

Displaying or projecting the projection image Pa makes it possible for the worker to understand a target to be chamfered and a diameter, following the chamfering, of the countersinking part. This also prevents the worker from making a mistake on the diameter of the countersinking part owing to the indication of the diameter of the countersinking part displayed or projected in the form of character information.

Figure 4C:
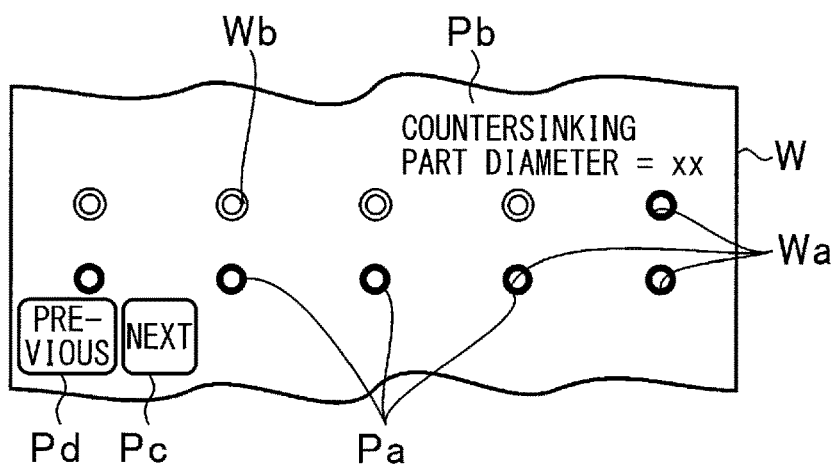

The completion determining unit 164 determines whether the chamfering of the through hole Wa is completed on the basis of the captured image data transmitted from the imaging device 110, as illustrated in FIG. 4C. The completion determining unit 164 may make this determination from the start of the operation process of forming the countersinking part and for each of the through holes Wa. FIG. 4C illustrates an example where the chamfering is in progress and tapered surfaces Wb are formed accordingly. For example, the completion determining unit 164 may determine that the chamfering of the relevant through hole Wa is completed when a line of contour that is after the completion of chamfering is detected from the captured image data. The display controller 166 may stop projecting, in sequence, the projection image Pa for any through hole Wa whose chamfering has been determined by the completion determining unit 164 as being completed.

Figure 4D:
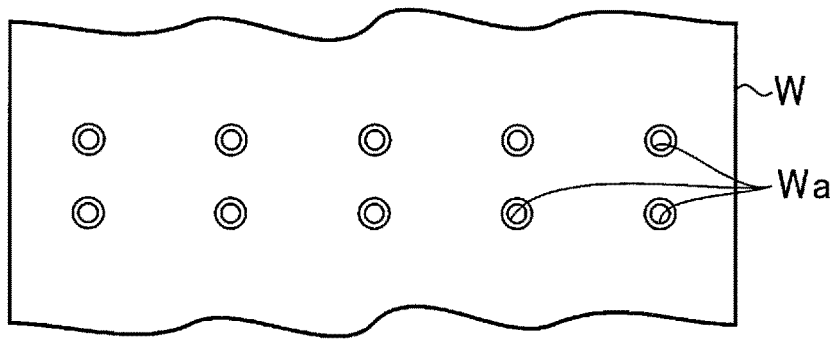

The completion determining unit 164 may determine, from the start of the operation process of forming the countersinking part, whether the chamfering of all of the through holes Wa as the targets has been completed. The completion determining unit 164 may determine that the operation process is completed when all of the target through holes Wa are chamfered as illustrated in FIG. 4D.

The projection data generator 162 may read the projection information from the storage 150, and specify a factor, such as a shape and a position, of the projection image that corresponds to the subsequent operation process, when the operation process is determined by the completion determining unit 164 as being completed. The projection data generator 162 may thereafter generate the image data on the basis of the specified factor, such as the shape, of the projection image. The display controller 166 may cause the projector 120 to display, as the operation information related to the subsequent operation process, the image data generated by the projection data generator 162.

Figure 5A:
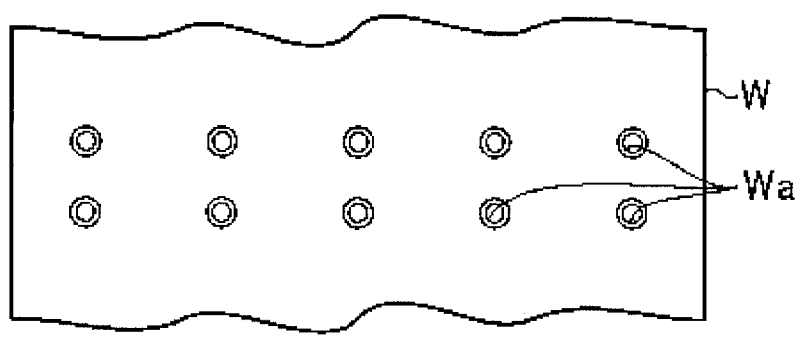
FIG. 5A to FIG. 5D are diagrams each illustrating an example of the projection process performed by the projection controller illustrated in FIG. 3.
Figure 5B:
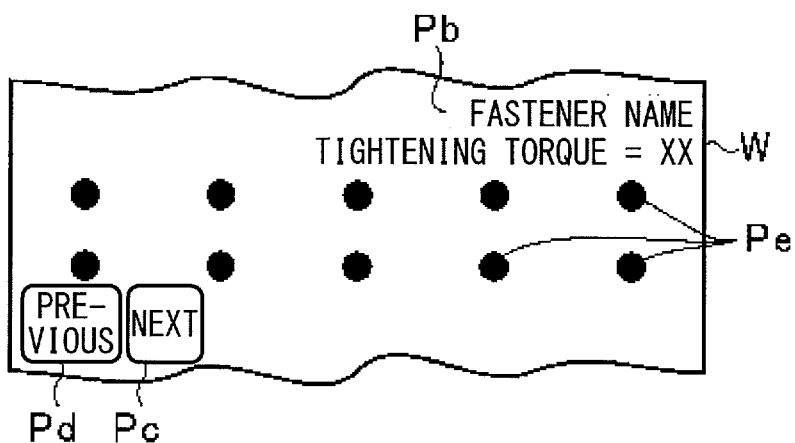

FIG. 5A to FIG. 5D are diagrams each illustrating an example of the projection process performed by the projection controller 130. An operation process subsequent to the operation process illustrated in FIGS. 4A to 4D may be a fastening operation that involves inserting a fastener into the through hole Wa. For example, the fastener may be a bolt or any other fastening member. Referring to FIG. 5B, the projection data generator 162 may generate, as the operation information, the projection image related to the workpiece W that is at the time of completion of the operation process of FIG. 5B.

For example, the projection data generator 162 may read the projection information from the storage 150, and specify a factor of the projection image that corresponds to the current operation process. Non-limiting examples of the factor may include a shape of the projection image. The projection data generator 162 may thereafter generate image data of a projection image Pe of the fastener on the basis of the specified factor, such as the shape, of the projection image. For example, the projection image Pe may have an outer diameter that corresponds to an outer diameter of a head of the fastener.

The projection data generator 162 may also generate, on the basis of the projection information, image data representing the projection image Pb, image data representing the projection image Pc that represents the subsequent-process switching button, and image data representing the projection image Pd that represents the previous-process switching button. The projection image Pb may represent, in characters, a factor such as the name of the fastener, a type of the fastener, or tightening torque.

The display controller 166 may so control the projector 120 as to display or project the pieces of image data generated by the projection data generator 162 on the workpiece W. Displaying or projecting an image of the fastener in this way makes it possible for the worker to understand the through hole Wa to be fastened and the outer diameter of the head of the fastener. This also prevents the worker from making a mistake on a kind of the fastener and the tightening torque owing to the indication of the name of the fastener and the tightening torque that are displayed or projected in the form of the character information.

Figure 5C:
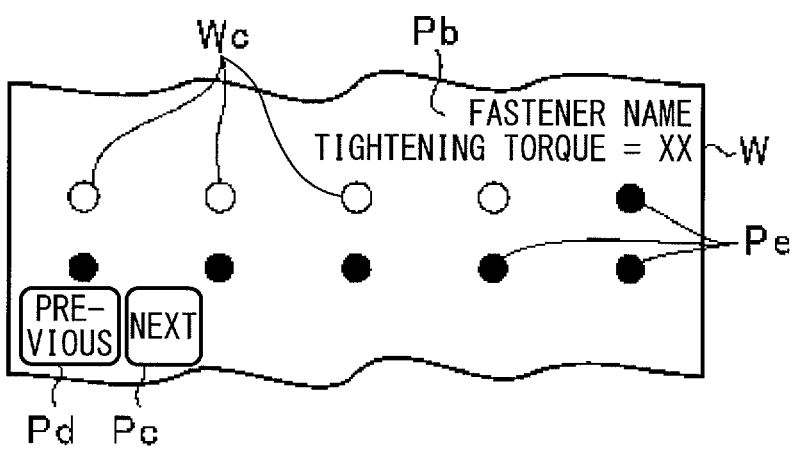

The completion determining unit 164 determines whether the operation of inserting the fastener Wc is completed on the basis of the captured image data transmitted from the imaging device 110, as illustrated in FIG. 5C. The completion determining unit 164 may make this determination from the start of the insertion operation of the fastener Wc and for each of the through holes Wa. FIG. 5C illustrates an example where the insertion operation is in progress. For example, the completion determining unit 164 may determine that the insertion operation of the relevant through hole Wa is completed when a line of contour of the head of the fastener Wc is detected from the captured image data. The display controller 166 may stop projecting, in sequence, the projection image Pe for any through hole Wa whose insertion operation of the fastener Wc has been determined by the completion determining unit 164 as being completed.

The completion determining unit 164 may determine, from the start of the insertion operation of the fastener Wc, whether the insertion operation of all of the through holes Wa as the targets has been completed. The completion determining unit 164 may determine that the operation process is completed when the insertion operation of the fastener Wc is completed for all of the target through holes Wa.

Figure 5D:
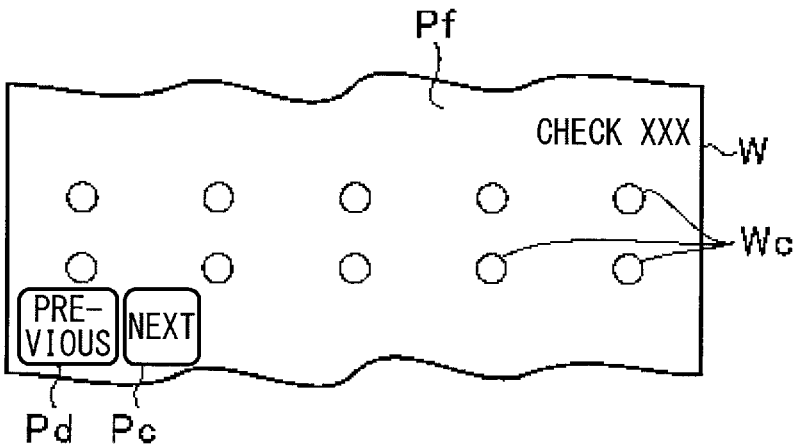

An operation process subsequent to the operation process illustrated in FIG. 5C may be a checking operation that involves checking as to whether the operations have been carried out in accordance with a drawing. Referring to FIG. 5D, the projection data generator 162 may generate, as the operation information, image data representing a projection image Pf. The projection image Pf may represent an item to be checked in characters. The display controller 166 may so control the projector 120 as to display or project the image data generated by the projection data generator 162 on the workpiece W. The image data to be displayed or projected by the projector 120 may also include: the image data representing the projection image Pc that represents the subsequent-process switching button; and the image data representing the projection image Pd that represents the previous-process switching button.

The worker may put his/her hand between the projector 120 and the projection image Pc that represents the subsequent-process switching button, when the worker has completed checking the item to be checked and the operations have been carried out in accordance with the drawing accordingly. Thus, the display controller 166 may determine that the subsequent-process switching button is operated by the worker, and cause the projector 120 to display the operation information related to a subsequent operation process. In an example implementation, the display controller 166 may determine that the subsequent-process switching button is operated through: performing a pattern matching process, related to a shape of the projection image Pc, on the captured image data generated by the imaging device 110; and identifying, on the basis of the pattern matching process, that a part of the projection image Pc is disappeared, i.e., shaded by the hand of the worker.

The worker may put his/her hand between the projector 120 and the projection image Pd that represents the previous-process switching button, when the operations have not been carried out in accordance with the drawing. Thus, the display controller 166 may determine that the previous-process switching button is operated by the worker owing to disappearance of a part of the projection image Pd as with a case of the projection image Pc, and cause the projector 120 to display the operation information related to the previous operation process. The worker may operate the previous-process switching button to return the display content up to the display content belonging to the operation process in which the relevant operation has not been carried out in accordance with the drawing and thereby to perform any necessary operation.

The completion determining unit 164 may cause the storage 150 to store information on the time at which each operation process is determined as being completed. For example, the completion determining unit 164 may cause the storage 150 to store a timestamp related to the completion of each operation process. For example, this configuration allows for utilization of the time information as an evidence to prove that an operation, such as the checking operation, has been carried out between operation processes.

In an example implementation described above, the worker may put his/her hand between the projector 120 and the subsequent-process switching button or between the projector 120 and the previous-process switching button to operate any of the subsequent-process switching button and the previous-process switching button. In an alternative example implementation, the worker may put a member, such as a light-emitting diode (LED) light, over the subsequent-process switching button or the previous-process switching button to ensure that the worker's operation made to the subsequent-process switching button or the previous-process switching button is detected. In a yet alternative example implementation, the worker may put a marker, whose shape has been registered in advance, between the projector 120 and the subsequent-process switching button or between the projector 120 and the previous-process switching button. The marker may be provided on a member such as a pointer.

Figure 6:
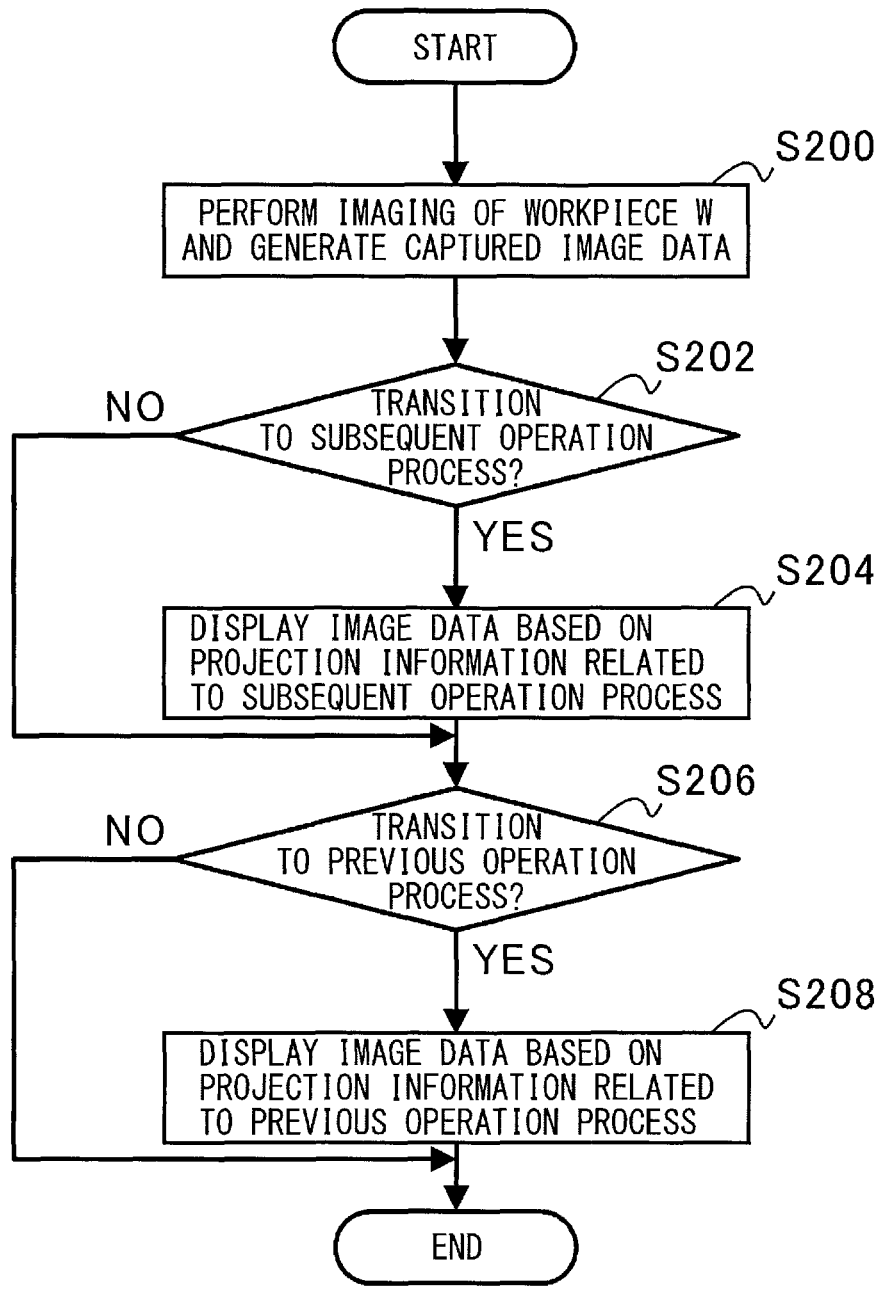
FIG. 6 is a flowchart illustrating an example of a flow of switching display contents performed by a display controller illustrated in FIG. 3.

FIG. 6 is a flowchart illustrating an example of a flow of switching display contents performed by the display controller 166. An example process illustrated in FIG. 6 may be executed repeatedly at every predetermined cycle.

[Step S200]

At step S200, the imaging device 110 performs the imaging of the workpiece W and thereby generate the captured image data. The imaging device 110 may transmit the captured image data to the projection controller 130.

[Step S202]

At step S202, the completion determining unit 164 may determine whether to make a transition to a subsequent operation process, on the basis of the captured image data transmitted from the imaging device 110. The transition to the subsequent operation process may be made when an operation in a relevant operation process is completed or when the subsequent-process switching button is operated, as described above. The flow may proceed to step S204 when the transition is to be made to the subsequent operation process (step S202: YES). The flow may proceed to step S206 when the transition is not to be made to the subsequent operation process (step S202: NO).

[Step S204]

When the transition is to be made to the subsequent operation process (step S202: YES), at step S204, the projection data generator 162 may read the projection information related to the subsequent operation process, and generate the image data of the projection image to be displayed or projected. The display controller 166 may so control the projector 120 as to display or project the image data generated by the projection data generator 162 on the workpiece W. Thereafter, the flow may proceed to step S206.

[Step S206]

After step S204 or when the transition is not to be made to the subsequent operation process (step S202: NO), at step S206, the completion determining unit 164 may determine whether to make a transition to a previous operation process, on the basis of the captured image data transmitted from the imaging device 110. The transition to the previous operation process may be made when the previous-process switching button is operated as described above. The flow may proceed to step S208 when the transition is to be made to the previous operation process (step S206: YES). The switching the display contents may end when the transition is not to be made to the previous operation process (step S206: NO).

[Step S208]

When the transition is to be made to the previous operation process (step S206: YES), at step S208, the projection data generator 162 may read the projection information related to the previous operation process, and generate the image data of the projection image to be displayed or projected. The display controller 166 may so control the projector 120 as to display or project the image data generated by the projection data generator 162 on the workpiece W.

Figure 7A:
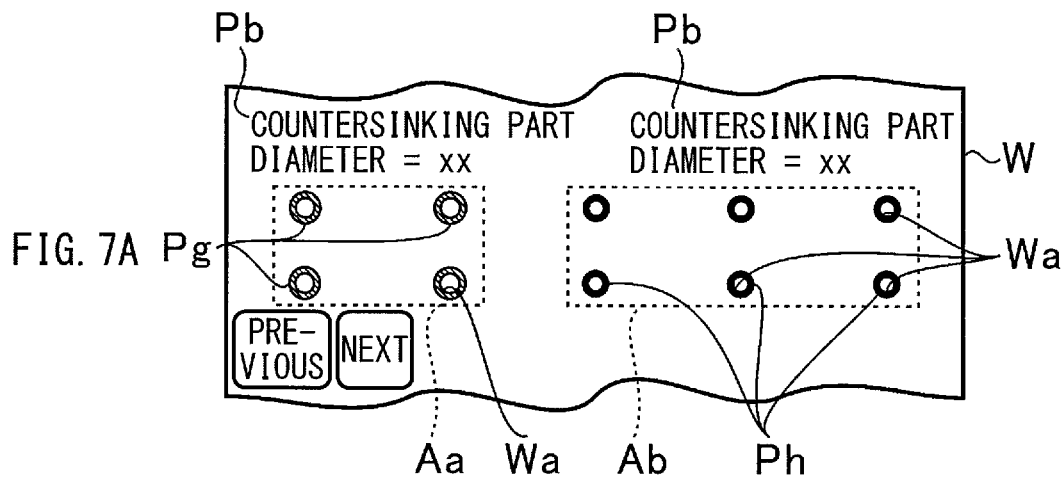
FIG. 7A is a diagram illustrating an example of the projection process performed by the projection controller according to a first modification example.

FIG. 7A is a diagram illustrating an example of the projection process performed by the projection controller 130 according to a first modification example. Referring to FIG. 7A, the through holes Wa, forming two lines as a set, may be divided into two operation regions Aa and Ab in the first modification example. For example, the operation regions Aa and Ab may be respectively provided on left and right in FIG. 7A. The operation region Aa provided on the left side in FIG. 7A may have four through holes Wa, whereas the operation region Ab provided on the right side in FIG. 7A may have six through holes Wa.

The four through holes Wa provided in the operation region Aa differ in inner diameter from the six through holes Wa provided in the operation region Ab, and may be therefore subjected to chamfering that is different, in diameter of the countersinking part formed thereby, from the chamfering performed on the six through holes Wa provided in the operation region Ab. Accordingly, the four through holes Wa provided in the operation region Aa differ from the six through holes Wa provided in the operation region Ab in type of a content of operation. In the first modification example, the four through holes Wa provided in the operation region Aa differ from the six through holes Wa provided in the operation region Ab in diameter of the countersinking part to be formed.

The projection data generator 162 may divide a region that includes the through holes Wa, which are grouped by diameter of the countersinking part, into the operation region Aa and the operation region Ab. Further, the projection data generator 162 may generate image data corresponding to a projection image Pg and image data corresponding to a projection image Ph. The projection image Pg may be projected onto the through holes Wa provided in the operation region Aa and the projection image Ph may be projected onto the through holes Wa provided in the operation region Ab. The projection image Pg and the projection image Ph may be made different from each other in inner and outer diameters in accordance with the inner diameter and the diameter of the countersinking part of the relevant through hole Wa. Accordingly, the projection data generator 162 may generate the pieces of image data which are different between the projection image Pg and the projection image Ph in manner in which the projection images Pg and Ph are displayed. For example, the projection data generator 162 may generate the pieces of image data which are different in color between the projection image Pg and the projection image Ph. The display controller 166 may cause the projector 120 to project the projection image Pg and the projection image Ph.

With this configuration, the displaying manner may be varied between the projection image Pg and the projection image Ph that are to be displayed by the projector 120, depending on the type of operation content of the relevant operation process. This makes it difficult for the worker to confuse operations to be performed on the respective operation regions Aa and Ab owing to the difference in displaying manner between the projection image Pg and the projection image Ph. Further, the projection image Pb that represents the diameter of the countersinking part in characters may be provided for each of the operation regions Aa and Ab. In this case, it is possible to further reduce a possibility that the worker confuses the operations to be performed on the respective operation regions Aa and Ab.

Note that non-limiting examples of the type of operation content may also include a length, a kind, and a diameter of the fastener as a member subjected to the insertion. Non-limiting examples of the type of operation may further include a difference in insertion operation, such as cooling fit, clearance fit, or wet installation that utilizes an adhesive.

Figure 7B:
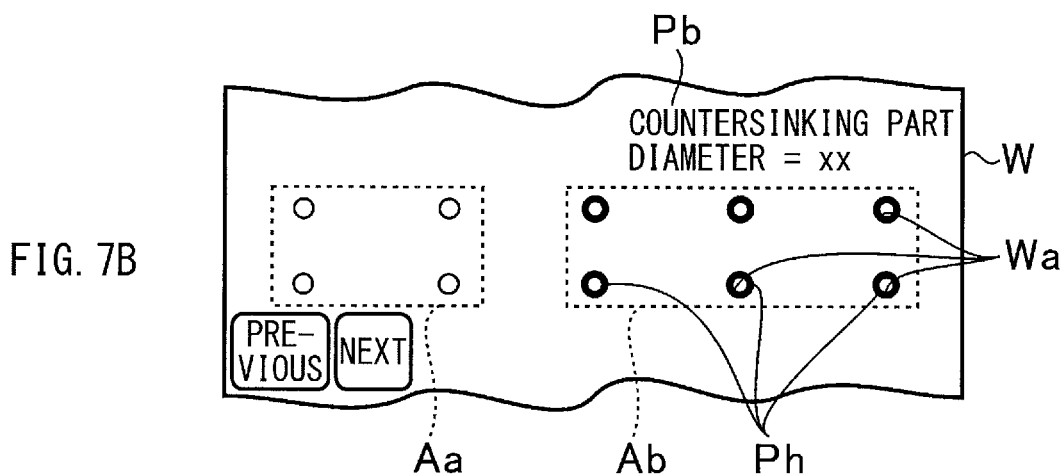
FIG. 7B and FIG. 7C are diagrams each illustrating an example of the projection process performed by the projection controller according to a second modification example.
Figure 7C:
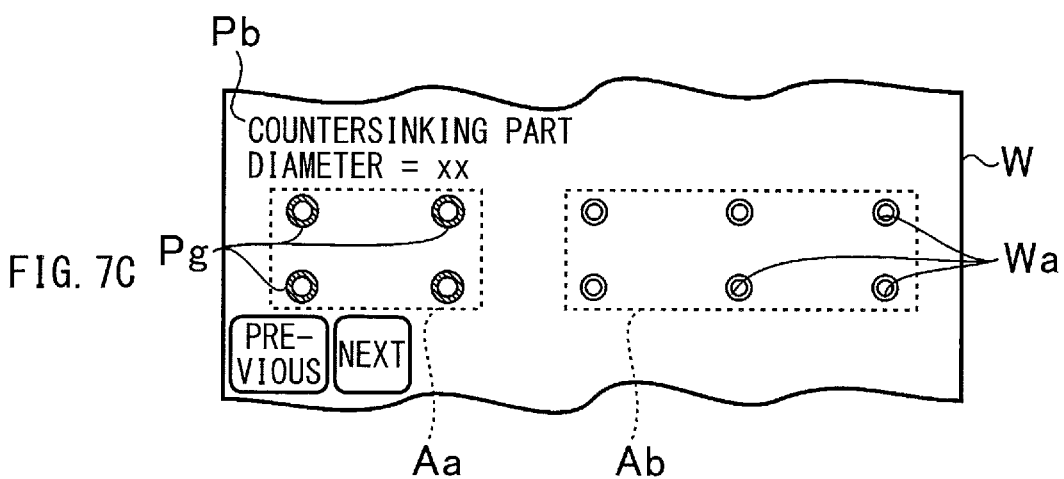

FIG. 7B and FIG. 7C are diagrams each illustrating an example of the projection process performed by the projection controller 130 according to a second modification example. In the second modification example, the projection data generator 162 may divide a region that includes the through holes Wa, which are grouped by diameter of the countersinking part, into the operation region Aa and the operation region Ab as with the first modification example. However, the second modification example differs from the first modification example in that the display controller 166 may first cause the projector 120 to project only the projection image Ph onto the operation region Ab without projecting the projection image Pg onto the operation region Aa, as illustrated in FIG. 7B.

For example, in the second modification example, the completion determining unit 164 may determine, from the start of the relevant operation process and on the basis of the captured image data transmitted from the imaging device 110, whether the chamfering of all of the through holes Wa belonging to the operation region Ab has been completed. The display controller 166 may cause the projection image Pg to be projected onto the operation region Aa when the completion determining unit 164 determines that all of the through holes Wa in the operation region Ab are chamfered.

Thereafter, the completion determining unit 164 may determine, on the basis of the captured image data transmitted from the imaging device 110, whether the chamfering of all of the through holes Wa belonging to the operation region Aa has been completed. A transition may be made to a subsequent operation process when the completion determining unit 164 determines that all of the through holes Wa in the operation region Aa are chamfered.

In this way, the second modification example starts projecting the projection image Pg and the projection image Ph in sequence depending on the type of operation content of the relevant operation process. Hence, it is possible to further reduce the possibility that the worker confuses the operations to be performed on the respective operation regions Aa and Ab.

Figure 8:
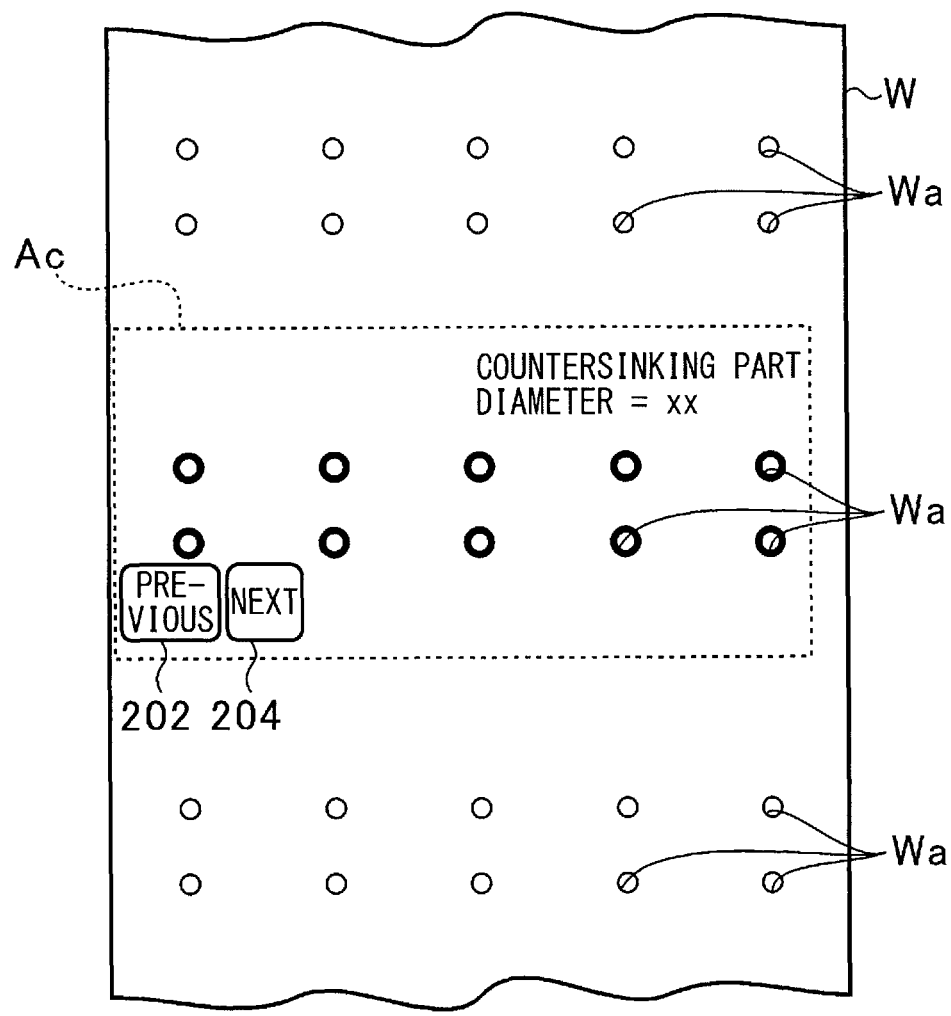
FIG. 8 is a diagram illustrating an example of the projection process performed by the projection controller according to a third modification example.

FIG. 8 is a diagram illustrating an example of the projection process performed by the projection controller according to a third modification example. In the third modification example, the completion determining unit 164 may detect an error in the relevant operation process, on the basis of the captured image data directed to an operation region Ac in the workpiece W. For example, if the diameter of the countersinking part following the chamfering is smaller than a design value, the completion determining unit 164 may detect, by the captured image data, an error that "the diameter of the countersinking part following the chamfering is smaller than the design value". In an example implementation, the completion determining unit 164 may derive the diameter of the countersinking part of the through hole Wa on the basis of the captured image data to compare the derived diameter of the countersinking part with the design value, and may determine that there is an error when the derived diameter of the countersinking part is equal to or greater than a tolerance.

Non-limiting examples of the error of operation in the operation region Ac detectable by the completion determining unit 164 may include: an excessive diameter of the fastener, the through hole Wa, or any other component, which exceeds its tolerance; a formation of the through hole Wa performed on a location other than a design location; and a lack of formation of the through hole Wa at the design location.

Further, in the third modification example, the completion determining unit 164 may detect an error in the relevant operation process, on the basis of the captured image data directed to a region in the workpiece W outside the operation region Ac. For example, if the worker has erroneously chamfered the through hole Wa positioned outside the operation region Ac even though a target of operation in the relevant operation process is the through hole Wa positioned inside the operation region Ac, the completion determining unit 164 may detect, by the captured image data, an error that "the worker performs an operation on the through hole Wa that is not the target of operation". In an example implementation, the completion determining unit 164 may derive the diameter of the through hole Wa positioned outside the operation region Ac on the basis of the captured image data to compare the derived diameter of the through hole Wa with a design value that is before the chamfering, and may determine that there is an error when the derived diameter of the through hole Wa is equal to or greater than a tolerance.

When the error is detected, the completion determining unit 164 may cause an error message to be projected as the projection image, may cause an alarm to be generated by an unillustrated speaker, or may notify the worker of the error by any other method.

In this way, the third modification example suppresses the worker's erroneous operation owing to the error detection performed by the completion determining unit 164. In particular, it is possible to detect an error in the operation content owing to the error detection performed for the operation region Ac, and detect an error in operation procedure owing to the error detection performed for a region outside the operation region Ac.

Although some implementations of the technology have been described in the foregoing by way of example with reference to the accompanying drawings, the technology is by no means limited to the example implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, although the chamfering operation, the fastener insertion operation, and the checking operation may be performed sequentially for a set of through holes Wa in the example implementations and the modification examples described above, the chamfering operation may be performed, on a set-by-set basis, for the through holes Wa belonging to all of the sets of through holes Wa. After the chamfering operation is performed for each set of through holes Wa, the fastener insertion operation may be performed for the through holes Wa belonging to all of the sets of through holes Wa on a set-by-set basis, followed by the checking operation.

Further, the perforating operation that forms the through holes Wa on the workpiece W may be performed without using any projection image in the example implementations and the modification examples described above. However, in an alternative example implementation, the projection image may also be used to assist the perforating operation or any other operation process.

Moreover, the completion determining unit 164 may also make a determination in any operation process prior to the perforating operation, on the basis of the captured image data. For example, the completion determining unit 164 may determine whether a position at which the workpiece W is attached to the support 10 is appropriate, whether a position at which the jig J is attached to the support 10 is appropriate, or whether any other position related to the support 10 is appropriate in any operation process prior to the perforating operation, on the basis of the captured image data that is obtained by the imaging performed on a region near the locating pin 15, a region near the retainer, or any other region of a component of the support 10. In such an example implementation, the completion determining unit 164 may cause an error message to be projected as the projection image, may cause an alarm to be generated by the unillustrated speaker, or may notify the worker of the error by any other method, when the completion determining unit 164 determines that any of the attachment positions is not appropriate.

The example implementations and the modification examples described above each may include the projector 120 that allows for projection of the operation information onto the workpiece W and thus makes it possible for the worker to understand the operation content intuitively. The projector 120, however, is not necessarily an essential feature. In an alternative example implementation, any other display may be used instead of the projector 120, such as a tablet terminal.

In the example implementations and the modification examples described above, the projection image related to the workpiece W that is at the time of completion of any operation process may be projected, as the operation information, onto the workpiece W by the projector 120. However, a content of the operation information is not limited to the workpiece W that is at the time of completion of any operation process.

The subsequent-process switching button and the previous-process switching button may be projected by the projector 120 in the example implementations and the modification examples described above. The projection of the subsequent-process switching button and the previous-process switching button improves operability of the projection controller 130, but is not necessarily an essential feature and may be omitted in an alternative example implementation accordingly.

The time information related to the time at which any operation process is determined as being completed may be stored in the storage 150 in the example implementations and the modification examples described above. The storing process of such time information in the storage 150, however, is not necessarily an essential feature and may be omitted in an alternative example implementation accordingly.

According to any of the foregoing example implementations and modification examples, it is possible improve an operation efficiency.

The central controller 160 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 160. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 160 illustrated in FIG. 3.

The invention claimed is:

1. A manufacturing assistance apparatus comprising:
 a display configured to display operation information that is related to any of operation processes of a workpiece;
 an imaging device configured to perform imaging of the workpiece, and output image data obtained by the imaging, the image data including a plurality of projection images each associated with one of the operation processes of the workpiece;
 a completion determining unit configured to determine whether current one of the operation processes is completed, on a basis of the image data outputted from the imaging device; and
 a display controller configured to:
  instruct the display to simultaneously display the plurality of projection images associated with the operation processes at an initial point in time;
  stop projecting, in sequence, the plurality of projection images as the completion determining unit detects completion of their associated operation processes; and
  cause, when the current one of the operation processes is determined by the completion determining unit as being completed, the display to display the operation information that is related to subsequent one of the operation processes.

2. The manufacturing assistance apparatus according to claim 1, wherein the display comprises a projector configured to project the operation information onto the workpiece.

3. The manufacturing assistance apparatus according to claim 2, wherein the display controller causes the display to project, as the operation information, at least one of the projection images related to the workpiece that is at a time of the completion of the current one of the operation processes.

4. The manufacturing assistance apparatus according to claim 3, wherein the display controller varies a manner in which the projection image is displayed by the display, depending on a type of an operation content of the current one of the operation processes.

5. The manufacturing assistance apparatus according to claim 2, wherein the display controller causes the display to project a subsequent-process switching button that switches a display content displayed by the display to a display content belonging to the operation information that is related to the subsequent one of the operation processes.

6. The manufacturing assistance apparatus according to claim 3, wherein the display controller causes the display to project a subsequent-process switching button that switches a display content displayed by the display to a display content belonging to the operation information that is related to the subsequent one of the operation processes.

7. The manufacturing assistance apparatus according to claim 4, wherein the display controller causes the display to project a subsequent-process switching button that switches a display content displayed by the display to a display content belonging to the operation information that is related to the subsequent one of the operation processes.

8. The manufacturing assistance apparatus according to claim 2, wherein the display controller causes the display to project a previous-process switching button that switches a display content displayed by the display to a display content belonging to the operation information that is related to previous one of the operation processes.

9. The manufacturing assistance apparatus according to claim 3, wherein the display controller causes the display to project a previous-process switching button that switches a display content displayed by the display to a display content belonging to the operation information that is related to previous one of the operation processes.

10. The manufacturing assistance apparatus according to claim 4, wherein the display controller causes the display to project a previous-process switching button that switches a display content displayed by the display to a display content belonging to the operation information that is related to previous one of the operation processes.

11. The manufacturing assistance apparatus according to claim 1, wherein the completion determining unit detects an error in any of the operation processes, on the basis of the image data that is directed to an operation region in the workpiece.

12. The manufacturing assistance apparatus according to claim 2, wherein the completion determining unit detects an error in any of the operation processes, on the basis of the image data that is directed to an operation region in the workpiece.

13. The manufacturing assistance apparatus according to claim 1, wherein the completion determining unit detects an error in any of the operation processes, on the basis of the image data that is directed to a region in the workpiece outside an operation region in the workpiece.

14. The manufacturing assistance apparatus according to claim 2, wherein the completion determining unit detects an error in any of the operation processes, on the basis of the image data that is directed to a region in the workpiece outside an operation region in the workpiece.

15. The manufacturing assistance apparatus according to claim 1, further comprising a storage configured to store time information that is related to time at which any of the operation processes is determined by the completion determining unit as being completed.

16. The manufacturing assistance apparatus according to claim 2, further comprising a storage configured to store time information that is related to time at which any of the operation processes is determined by the completion determining unit as being completed.

17. A manufacturing assistance apparatus comprising:
a display configured to display operation information that is related to any of operation processes of a workpiece;
an imaging device configured to perform imaging of the workpiece, and output image data obtained by the imaging, the image data including a plurality of projection images each associated with one of the operation processes; and
circuitry configured to
instruct the display to simultaneously display the plurality of projection images associated with the operation processes at an initial point in time;
determine whether current one of the operation processes is completed, on a basis of the image data outputted from the imaging device;
stop projecting, in sequence, the plurality of projection images as their associated operation processes are determined as being completed; and
cause, when the current one of the operation processes is determined as being completed, the display to display the operation information that is related to subsequent one of the operation processes.

* * * * *